US012580460B2

(12) United States Patent
Hubert et al.

(10) Patent No.: US 12,580,460 B2
(45) Date of Patent: Mar. 17, 2026

(54) ELECTRICAL MACHINE HAVING A CONDUCTIVE LAYER

(71) Applicant: AKTIEBOLAGET SKF, Gothenburg (SE)

(72) Inventors: Mathieu Hubert, Turin (IT); Paul Feliciano, Saint Cyr-sur-Loire (FR); Thomas Perrotin, Saint Roch (FR); Anthony Simonin, Tours (FR)

(73) Assignee: AKTIEBOLAGET SKF (SE)

( * ) Notice: Subject to any disclaimer, the term of this patent is extended or adjusted under 35 U.S.C. 154(b) by 195 days.

(21) Appl. No.: 18/388,393

(22) Filed: Nov. 9, 2023

(65) Prior Publication Data

US 2024/0072619 A1 Feb. 29, 2024

Related U.S. Application Data

(63) Continuation of application No. 17/712,304, filed on Apr. 4, 2022, now Pat. No. 11,936,254.

(30) Foreign Application Priority Data

Apr. 12, 2021 (IT) .......................... 102021000009014

(51) Int. Cl.
*H02K 11/40* (2016.01)
*H02K 5/173* (2006.01)
*H02K 7/08* (2006.01)

(52) U.S. Cl.
CPC ............. *H02K 11/40* (2016.01); *H02K 5/173* (2013.01); *H02K 7/08* (2013.01)

(58) Field of Classification Search
CPC .......... H02K 11/40; H02K 5/173; H02K 7/08; F16C 2223/70; F16C 41/002; F16C 19/06
See application file for complete search history.

(56) References Cited

U.S. PATENT DOCUMENTS 3,867,176 A * 2/1975 Dalton ...................... C23F 1/00
29/898.12
5,352,046 A * 10/1994 Ward ...................... F16C 33/32
384/492

(Continued)

FOREIGN PATENT DOCUMENTS

DE 29916854 1/2000
DE 102018115732 1/2020

(Continued)

OTHER PUBLICATIONS

WO-2017148586-A1_translate (Year: 2017).*

(Continued)

*Primary Examiner* — Tulsidas C Patel
*Assistant Examiner* — Mohammed Ahmed Qureshi
(74) *Attorney, Agent, or Firm* — Reed Smith LLP

(57) ABSTRACT

An electrical machine includes a non-rotating part, a rotating part, at least one bearing that includes a rotating ring and a non-rotating ring and supports the rotating part, a grounding brush fixed and secured to the non-rotating part, and having a free end extending towards the rotating ring of the bearing, and a conductive layer covering a portion of a surface of the rotating ring of the bearing such that the free end of the grounding brush is in contact with the conductive layer.

9 Claims, 3 Drawing Sheets

(56) References Cited

U.S. PATENT DOCUMENTS

| | | | |
|---|---|---|---|
| 7,193,836 B2 * | 3/2007 | Charles | H02K 11/40 |
| | | | 361/220 |
| 8,324,776 B2 | 12/2012 | Tamaoka et al. | |
| 9,859,672 B2 | 1/2018 | Fukumoto | |
| 2005/0013041 A1 | 1/2005 | Macleod et al. | |
| 2005/0206270 A1 | 9/2005 | Aisenbrey | |
| 2007/0040459 A1 | 2/2007 | Oh | |
| 2008/0258576 A1 | 10/2008 | Oh et al. | |
| 2013/0287329 A1 | 10/2013 | Varnoux et al. | |
| 2014/0334758 A1 | 11/2014 | White | |
| 2016/0372987 A1 | 12/2016 | Tejano et al. | |
| 2019/0296617 A1 | 9/2019 | Hubert et al. | |
| 2020/0263734 A1 | 8/2020 | Kottapalli et al. | |
| 2020/0295634 A1 | 9/2020 | Lenz et al. | |
| 2021/0088076 A1 | 3/2021 | Knoblauch | |
| 2021/0115974 A1 | 4/2021 | Schamin | |

FOREIGN PATENT DOCUMENTS

| | | | | |
|---|---|---|---|---|
| EP | 0315523 B1 * | 5/1992 | | C25D 3/46 |
| JP | 2005114119 | 4/2005 | | |
| JP | 2008286229 | 11/2008 | | |
| WO | WO-2017148586 A1 * | 9/2017 | | F16C 19/52 |
| WO | 2020015772 | 1/2020 | | |

OTHER PUBLICATIONS

EP-0315523-B1_translate (Year: 1992).*

U.S. Appl. No. 17/712,304.

Search Report for French Patent Application No. 2201589 dated Jul. 25, 2024.

Search Report for corresponding Italian Patent Application No. 102021000009005 dated Dec. 8, 2021.

Search Report for corresponding Italian Patent Application No. 102021000009014 dated Dec. 8, 2021.

Search Report for corresponding French Patent Application No. 2210913 dated Jan. 24, 2023.

* cited by examiner

ELECTRICAL MACHINE HAVING A CONDUCTIVE LAYER

CROSS-REFERENCE TO RELATED APPLICATIONS

This application is a continuation application of U.S. patent application Ser. No. 17/712,304 filed on Apr. 4, 2022 and based on and claims priority to Italian Patent Application No. 102021000009014 filed on Apr. 12, 2021, under 35 U.S.C. § 119, the disclosure of which is incorporated by reference herein.

FIELD

The present disclosure relates generally to electrical rotary machines.

BACKGROUND

In electrical rotary machines, a power supply generates a potential difference in electrical potential between a shaft and a housing, leading to an electrical potential between an inner ring of a bearing and an outer ring of the bearing. The potential difference between the inner ring and the outer ring can lead to a discharge of current through the bearing.

Various embodiments in accordance with this disclosure will now be described with reference to the appended drawings illustrating non-limiting exemplary embodiments, in which.

DETAILED DESCRIPTION

Electrical rotary machines generally comprise a housing and a rotating shaft supported by at least one bearing. A current passing through the bearing may damage raceways and rolling elements of the bearing. Inadvertent electrical discharges can also create vibrations which increase acoustic noise of the rotary machine.

A rotating shaft may be grounded using a brush with conductive fibers. A grounding brush may be mounted to a frame of a rotary machine such that distal ends of its fibers radially contact an outer surface of a rotating shaft.

A conductivity of fibers of a grounding brush create a parallel electrical path and thus allows a shaft to maintain a same electrical potential as a frame of an integral machine. This also maintains a same electrical potential at an inner and an outer ring of a bearing supporting a shaft and significantly reduces electrical discharges through a bearing.

However, even with such a grounding brush, a resistance of a shaft surface has been found to increase over time due to a shaft surface electrical change. Indeed, during a service life of a motor, oxidation may occur on a surface of a shaft, due, for example to heat, humidity, electrical current flow, or friction.

Because of surface changes on a shaft, a grounding brush may have a higher resistance and a higher breakdown voltage than a bearing and may not be able to create a parallel path for a current. A current will then go through a bearing and create significant damage to the bearing and might even destroy it. Thus it is desirable to protect an outer surface of a rotating part in order to avoid any change during the service life of a motor.

In order to reduce risk of oxidation of an outer surface of a shaft, and thus maximize its conductivity, a coating made of a resin, such as epoxy, may be applied on the outer surface of the shaft to be protected. However, known coating solutions have low hardness and can be damaged or removed by sliding of a grounding brush. An aim of the present disclosure is to improve protection of a sliding surface of a rotating part.

The expressions "outer" and "inner" refer to a rotational axis of symmetry X of the rotating part of an electrical machine 10, with inner parts being closer to said axis than outer parts.

Figure 1:
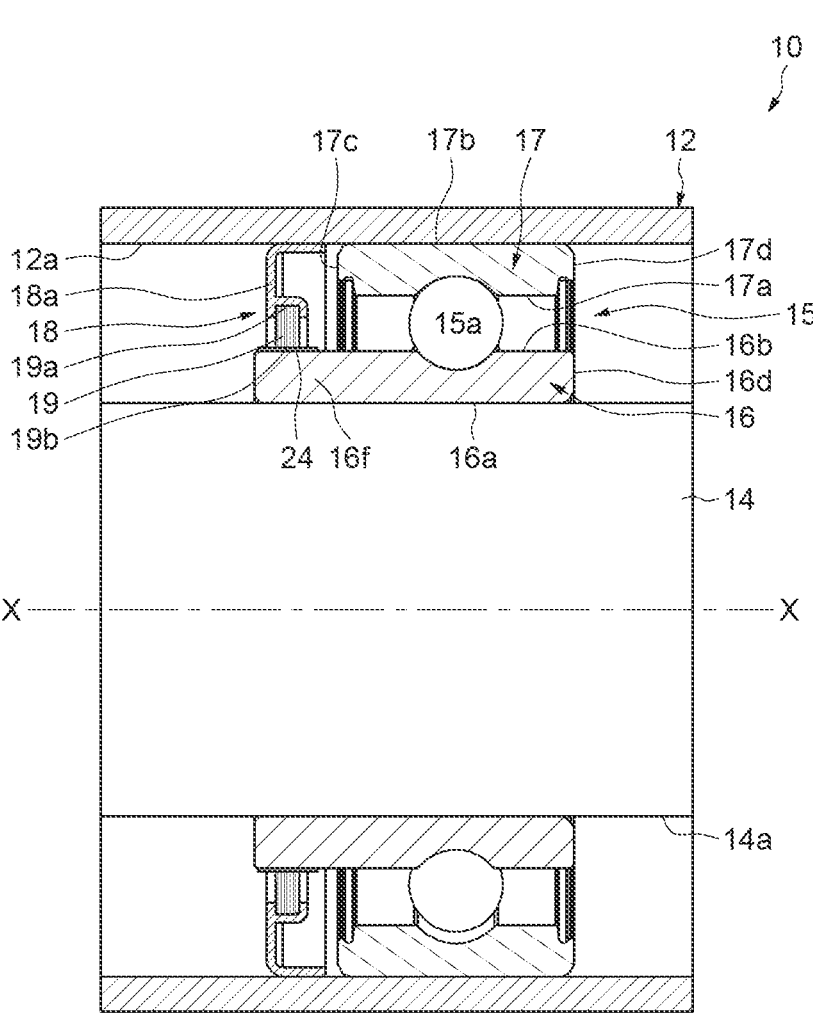
FIG. 1 is a schematic cross-sectional view of an electrical machine having a conductive layer according to an exemplary embodiment.

With reference to FIG. 1, various embodiments of an electrical machine 10 may include a non-rotating housing 12, a rotating shaft 14, at least one bearing 15 supporting the shaft 14, and a grounding brush 18 mounted in housing 12. In other embodiments, a housing 12 may be rotating and a shaft 14 may be non-rotating.

Figure 3:
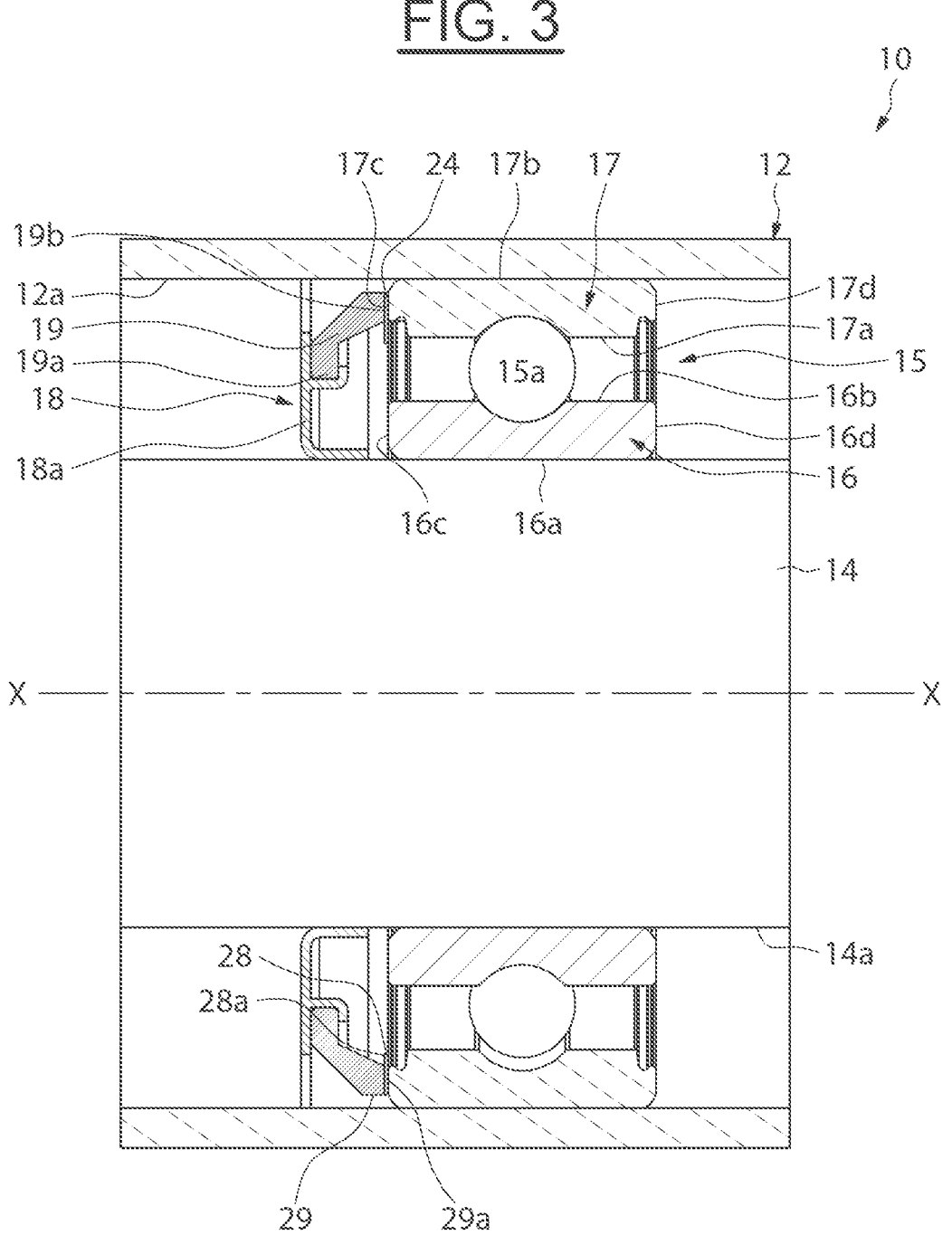
FIG. 3 illustrates a schematic cross-sectional view of an electric machine having a conductive layer applied to an outer ring of a bearing unit according to an exemplary embodiment.

In various embodiments, a housing 12 may be radially delimited by an inner cylindrical surface 12*a* and an outer cylindrical surface 12*b*. A rotating shaft 14 may have an outer cylindrical surface 14*a*. At least one bearing 15 may be radially mounted on an inner surface of a bore 12*a* of housing 12. A bore 12*a* of housing 12 may be provided with one or more shoulders that axially maintain a bearing 15 in housing 12. In various embodiments, a bearing 15 may include an inner rotating ring 16, an outer non-rotating ring 17, and at least one row of one or more rolling elements 15*a*, e.g., rollers, arranged between inner ring 16 and outer ring 17. In some embodiments, a bearing 15 may include a cage (not shown) configured to maintain a circumferential spacing of rolling elements 15*a*. In other embodiments, an inner ring 16 may be non-rotating and an outer ring 17 may be rotating (see, e.g., FIG. 3). In some embodiments, a bearing 15 may be a sliding bearing.

In various embodiments, an inner ring 16 of a bearing 15 may be of a solid type and may be radially delimited by an inner cylindrical surface 16*a*, in radial contact with a shaft 14, and an outer cylindrical surface 16*b* having a raceway for at least one rolling elements 15*a*. An inner ring 16 may include two opposite radial frontal faces 16*c* and 16*d* which axially delimit an inner cylindrical surface 16*a* of inner ring 16 and an outer cylindrical surface 16*b* of inner ring 16.

In various embodiments, an outer ring 17 of a bearing 15 may be of a solid type and may be radially delimited by an inner cylindrical surface 17*a* having a raceway for at least one rolling elements 15*a* and an outer cylindrical surface 17*b* in radial contact with an inner surface 12*a* of a housing 12. An outer ring 17 may include two opposite radial frontal faces 17*c* and 17*d* which axially delimit an inner cylindrical surface 17*a* of outer ring 17 and an outer cylindrical surface 17*b* of outer ring 17.

In various embodiments, an inner ring 16 may include an axial portion 16*f* extending axially beyond a lateral face 17*c* of an outer ring 17.

In various embodiments, a fiber grounding brush 18 may include a support 18*a* and a plurality of conductive fibers 19 having a first end 19*a* secured to support 18*a* and a second free end 19*b* on a side opposite first end 19*a* extending radially towards an inner ring 16. Support 18a may be secured to a housing 12 by press fitting support 18a onto an inner surface 12a of housing 12. In other embodiments, a support 18a may be secured to a housing 12 with fasteners or adhesives. In other embodiments, a support 18a may be secured to a bearing 15. In such embodiments, support 18a may be secured to an outer ring 17 of bearing 15.

A ground brush 18 may be any suitable ground brush. By way of non-limiting example, a ground brush 18 may be a fiber ground brush made of carbon fibers, a spring loaded solid brush made of a conductive material, e.g., graphite, metallic powder, or conductive felt, or a polymer brush with an electrically conductive layer or a conductive flier, e.g., a seal with carbon loaded in the polymer matrix or Polytetrafluoroethylene (PTFE) seal with a conductive coating;

In various embodiments, an electrical machine 10 may include a conductive layer 24 made of a conductive material, e.g., a metallic material, applied by electroplating or electroless plating on an inner ring 16 of a bearing 15. Conductive layer 24 may be applied on an outer surface of an axial portion 16f of an inner ring 16. In other embodiments, a conductive layer 24 may cover an entire outer surface of an inner ring 16. In some embodiments, a metallic material may be a noble metal such as gold, silver, or platinum. Noble metals are extremely resistant to chemical change and thus extremely resistant to corrosion. In addition, a conductive layer 24 made of a noble metal provides a harder sliding surface than an epoxy coating and is thus more resistant over time to brush abrasion.

In other embodiments, metallic material may be an ignoble metal, such as tin or nickel. Ignoble metals have a very fast corrosion layer, but are thin enough to maintain good electrical performances. In embodiments a metallic material is a non-oxidizing metallic material having a higher conductivity than the materials forming an inner ring or an outer ring.

In various embodiments, a conductive layer 24 may face a free end 19b of a plurality of conductive fibers 19 of a conductive brush 18 and form a sliding surface for conductive fibers 19. Free end 19b of conductive fibers 19 of conductive brush 18 may be in radial contact with conductive layer 24.

Figure 2:
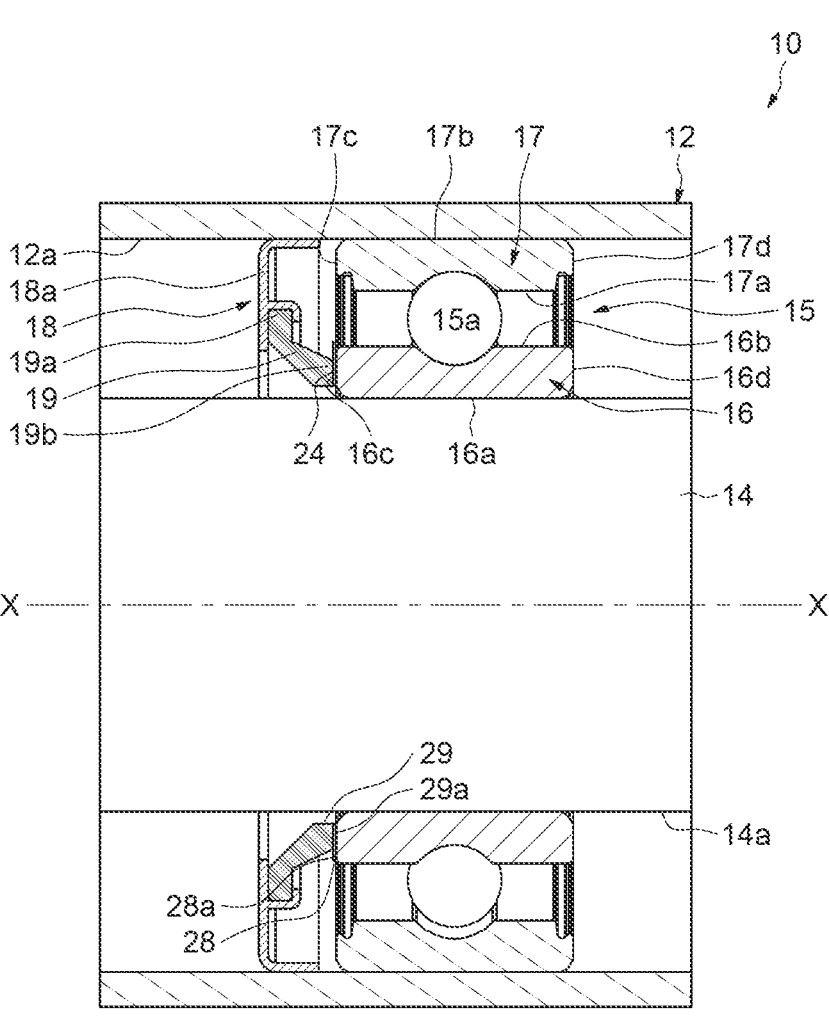
FIG. 2 is a schematic cross-sectional view of an electrical machine having a conductive layer applied on a lateral face an inner ring of a bearing according to an exemplary embodiment.

As shown in FIG. 2, an exemplary embodiment of an electrical machine 10 may include a conductive layer 24 applied on a lateral face 16c of an inner ring 16 of a bearing 15. A plurality of fibers 19 of a conductive brush 18 may extend towards later face 16c of inner ring 16 covered with conductive layer 24 and at an incline with respect to an axis of symmetry X of a bearing 15.

In various embodiments, a free end 19b of a plurality of fibers 19 of a conductive brush 18 may be in axial contact with a conductive layer 24.

In various embodiments, a shape of a plurality of fibers 19 of a conductive brush 18 may be compact. In other embodiments, a shape of a plurality of fibers 19 of a conductive brush 18 may be non-compact.

Combining a grounding brush, e.g., 18, with a conductive layer, e.g., 24 having a sliding surface made of such conductive material may reduce a contact resistance and a breakdown voltage of the brush during a service life of a motor. Furthermore, sliding surface changes may be reduced during a service life of an electric machine 10 according to this disclosure.

In general, a conductive brush 18 may be fixed to a non-rotating ring of a bearing 15 and a conductive layer 24 may be plated to a rotating ring of the bearing.

A further aim of this disclosure is to provide an electrical machine may include a non-rotating part, a rotating part, at least one bearing supporting said rotating part and a grounding brush fixed to said non-rotating part. Said bearing may include a rotating ring and a non-rotating ring. Said grounding brush may be secured to the non-rotating part and have a free end, extending towards the rotating ring of the bearing.

An electrical machine may further include a conductive layer covering at least a portion of a surface of the rotating ring of the bearing, the free end of the grounding brush being in contact with said conductive layer.

The conductive layer acts as an integrated, dedicated sliding surface for the grounding brush and ensures a minimum contact resistance over time that avoids sliding surface change over time.

In various embodiments, the grounding brush may be a spring-loaded solid brush made of a conductive material, such as, graphite or metallic powder.

In another embodiment, the grounding brush may be made of a conductive felt.

In various embodiments, the grounding brush may be made of a polymer with an electrical conductive layer or a conductive filler, such as a seal with carbon loaded in the polymer matrix, or a PTFE seal with a conductive coating.

In various embodiments, the grounding brush may be a fiber brush having a support secured to the non-rotating part and a plurality of conductive fibers having a first end secured to said support and a second free end, opposite to said first end. The fibers may extend towards the rotating ring of the bearing. The second free end of the conductive fibers of the fiber grounding brush may be in contact with the conductive layer.

According to various embodiments, the rotating ring includes an axial portion extending axially beyond a lateral face of the non-rotating ring. The conductive layer may cover at least a cylindrical surface of said axial portion, for example the outer or the inner surface.

In various embodiments, the brush extends radially towards the cylindrical surface of the rotating ring of bearing covered with the conductive layer. The free end of the conductive brush may be in radial contact with the conductive layer.

According to various embodiments, the conductive layer may cover a lateral face of the rotating ring of the bearing. The brush may extend in an inclined direction towards the lateral face of the rotating ring of the bearing covered with the conductive layer. The free end of the conductive brush may be in axial contact with the conductive layer.

In various embodiments, the conductive layer is applied by platting on the rotating ring of the bearing.

The conductive layer may be made of a metallic material. In various embodiments, the metallic material may be a noble material such as gold, silver, or platinum. In other embodiments, the metallic material may be an ignoble material, such as tin or nickel.

In various embodiments, the rotating ring may be entirely covered with the conductive layer.

In various embodiments, the rotating ring is the inner ring and the non-rotating ring is the outer ring of the bearing.

In various embodiments, the rotating part is a shaft and the non-rotating part is a housing.

We claim:

1. An electrical machine comprising:
   a non-rotating part;
   a rotating part;

at least one bearing supporting said rotating part, the at least one bearing comprising:

a non-rotating outer ring comprising a lateral face; and a rotating inner ring comprising an axial portion extending axially beyond the lateral face of the non-rotating outer ring, wherein the axial portion of the rotating inner ring comprises a cylindrical surface; and a grounding brush fixed to the non-rotating part, the grounding brush comprising a free end extending towards the rotating inner ring of the at least one bearing; and a conductive layer covering a portion of the cylindrical surface of the axial portion of the rotating inner ring of the at least one bearing, wherein the free end of the grounding brush is in contact with the conductive layer.

2. The electrical machine according to claim 1, wherein the free end of the fiber grounding brush is in radial contact with the conductive layer.

3. The electrical machine according to claim 1, wherein the conductive layer is applied by electroplating on the rotating inner ring of the at least one bearing.

4. The electrical machine according to claim 1, wherein the conductive layer is made of a metallic material.

5. The electrical machine according to claim 4, wherein the metallic material is a noble metal.

6. The electrical machine according to claim 5, wherein the noble metal is selected from a group consisting of gold, silver, and platinum.

7. The electrical machine according to claim 4, wherein the conductive layer is made of a metallic material is an ignoble metal.

8. The electrical machine according to claim 7, wherein the ignoble metal is selected from a group consisting of tin and nickel.

9. The electrical machine according to claim 1, wherein the conductive layer is applied by electroless plating on the rotating inner ring of the at least one bearing.

\* \* \* \* \*